July 1, 1969 G. J. MANDERS 3,453,398

MULTIPLE MAGNETIC HEAD PROVIDING UNIFORM BEARING SURFACE DETRITION

Filed Oct. 8, 1965

INVENTOR.
GODEFRIDUS J. MANDERS

BY

[signature]

AGENT 3,453,398

MULTIPLE MAGNETIC HEAD PROVIDING UNIFORM BEARING SURFACE DETRITION

Godefridus Johannes Manders, Emmasingel, Eindhoven, Netherlands, assignor to U.S. Philips Corporation, New York, N.Y., a corporation of Delaware Filed Oct. 8, 1965, Ser. No. 494,152
Claims priority, application Netherlands, Oct. 10, 1964, 6411822
Int. Cl. G11b *5/00*
U.S. Cl. 179—100.2 4 Claims

ABSTRACT OF THE DISCLOSURE

A multiple magnetic head providing both uniform wear across its tape bearing surface as well as effective screening between individual magnetic circuits. The individual magnetic circuits are separated by a central screening plate of high permeability capped by another plate which, together with insulating plates and magnetic circuit elements form a tape bearing surface having uniform wear characteristics.

The invention relates to a multiple magnetic head for recording, playing back and/or erasing magnetic recordings comprising at least two magnetic circuits each consisting of at least two interconnected circuit elements of sintered oxidic ferromagnetic material. The circuits each include at least one effective gap and are connected together for part of the total height of the head adjacent the bearing surface of the head, by means of two plates of non-magnetizable material between which a plate of sintered oxidic ferromagnetic material is arranged.

The effective gaps in the magnetic circuits may be arranged so that the same track of magnetic recordings on a record carrier successively passes the two gaps. Such magnetic heads are used, for example, to produce reverberation and echo effects. The gaps may also be in alignment so that they cover juxtaposed, for example, parallel, tracks of magnetic recordings. Such magnetic heads enable, for example, stereophonic recordings and/or reproductions.

Multiple magnetic heads of which the magnetic circuits are separated from one another by means of plates of alternately magnetizable and non-magnetizable material have already been proposed. The manufacture of these heads is carried out by first composing the total body of the head consisting of magnetic circuits and interposed screening and strengthening plates and then providing the bearing surface and accurately finishing it.

It is known that in magnetic heads consisting of two or more separate magnetic circuits which all comprise one or more effective gaps which are located in the bearing surface of the record carrier of the head, the said circuits can easily influence one another.

To avoid this influence a magnetic screening is normally provided between the circuits consisting of, for example, two plates of non-magnetizable material with interposed a plate of a readily magnetizable material. Since the influencing takes place mainly through the part of the head which is just below the bearing surface, it is necessary that the said screening extends accurately in the bearing surface of the head.

In order to meet the above requirements with regard to screening, magnetic heads have been constructed. First, the separate circuits comprising an effective gap are manufactured and then the plates of magnetically insulating material, interposed with a plate of readily magnetizable material, are provided between the said circuits. The bearing surface is finally given the correct shape by grinding and polishing in which the desired height of the gap is determined.

A drawback of the said method is that, when the circuit elements consist of sintered oxidic ferromagnetic material, as is normal in such heads, and the readily magnetizable screening plate consists of a different material, it is very difficult to polish the bearing surface entirely smooth as a result of the difference in mechanical properties between the material, in particular in hardness. The result often is, that at the area of the screening plate a cavity is formed in the bearing surface since the screening material generally is softer than the sintered oxidic material. When with the above method and by means of many precautions nevertheless an entirely smooth surface is obtained, the above cavity will rapidly be formed in the bearing surface after a record carrier has moved on the said surface for some time as a result of the difference in detrition between the different materials.

Since, as already stated, the mutual influencing of the circuits is largest through that part of the head which is located just below the bearing surface where also the said cavity will be formed, multiple magnetic heads as stated above will not give good satisfaction when high requirements are imposed upon the mutual screening of the circuits.

The above drawbacks with regard to the mechanical properties do not occur when sintered oxidic ferromagnetic material is also used as the material for the readily magnetizable screening plate. However, in that case the permeability of the screening material often turns out to be not high enough to meet the requirements (the $\mu_r$ of ferrite is approximately 1500, whereas the $\mu_r$ of material known under the trademark "Mu-Metal" is in the order of 10,000).

The invention is based on the recognition of the fact that it is possible to avoid both the drawbacks as a result of the uneven resistance to detrition of the bearing surface and the drawbacks of the screening plate with too low a permeability to meet the requirements of screening and a multiple magnetic head as meant above. These drawbacks are overcome and the requirements met according to the invention in that a second plate of magnetizable material is provided in line with the plate of sintered oxidic ferromagnetic material on the side remote from the bearing surface of the head, which plates are connected mechanically and magnetically.

According to an embodiment of the invention the said second plate consists of a highly permeable metal alloy of which the main constituent is Ni. As examples are mentioned alloys of the following compositions:

| | Percent by weight |
|---|---|
| Ni | 77 |
| Cu | 5 |
| Cr | 2 |
| Fe | 16 |
| Ni | 78 |
| Mo | 4 |
| Fe | 18 |
| Ni | 78 |
| Mo | 4 |
| Cu | 5 |
| Fe | 13 |

The permeability of the said alloys which lies in the order of from 10,000–50,000 is much higher than that of the sintered oxidic ferromagnetic materials which considerably improves the screening effect.

In certain cases, however, it is desirable to keep the eddy-current losses in the *whole* magnetically readily conducting screening plate as small as possible. This means that a readily magnetizable sintered oxidic material which electrically is poorly conducting is to be preferred in spite of the lower permeability ($\mu$ in the order of 5000). For this purpose, according to a further embodiment of the invention, the second plate consists of sintered oxidic ferromagnetic material.

The invention also comprises a method of manufacturing multiple magnetic heads as described above which method is characterized in that first the magnetic circuits are secured together, at the height of those sides of the circuits where the effective gaps are located, by means of two plates of sintered oxidic non-magnetizable material between which a plate of sintered oxidic ferromagnetic material is secured, that the bearing surface of the head is then finished in known manner, and that finally on the side of the plate of sintered oxidic ferromagnetic material remote from the bearing surface a second plate of magnetizable material is secured.

In order that the invention may readily be carried into effect it will now be described in greater detail, by way of example, with reference to the accompanying drawing which shows embodiments of the invention.

Figure 1:
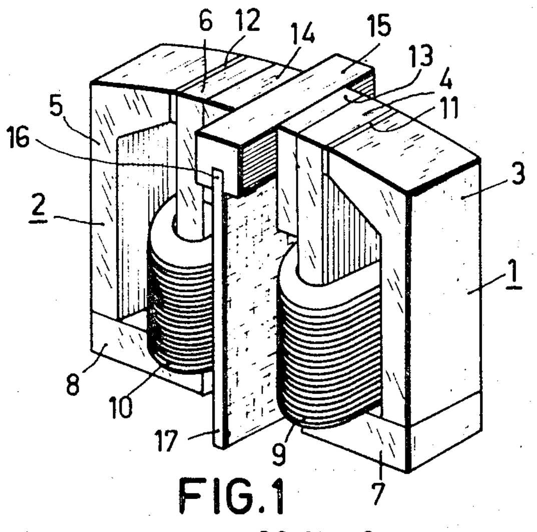
FIG. 1 is an isometric side elevation of a multiple magnetic head according to the invention which comprises parallel effective gaps located after one another when viewed in the direction of travel of the record carrier.

Referring now to FIG. 1, reference numerals 1 and 2 denote magnetic circuits which each consist of two circuit elements 3, 4 and 5, 6 respectively of sintered oxidic ferromagnetic material. Bottom portions 7 and 8 respectively of the magnetic circuits may be secured, if required, as separate components to the elements 3 and 4 and 5 and 6 respectively. Wire turns are arranged around the magnetic circuits and are denoted by 9 and 10 respectively while the effective gaps which are arranged between the circnuit elements 3 and 4 and 5 and 6 respectively are denoted 11 and 12 respectively. These gaps are filled with nonmagnetizable material which also secures together the two circuit elements which enclose the gap.

The two circuits 1 and 2 are mechanically connected together through plates 13 and 14 which consist of a non-magnetizable sintered oxidic material with interposed a plate 15 of a readily magnetizable sintered oxidic material. The plates 13 and 14 serve to insulate the circuits 1 and 2 magnetically from one another and from the plate 15. In order to make the resistance to detrition of the whole surface of the head (the bearing surface) equal, all parts and plates which constitute the said surface consist of the same type of material namely sintered oxidic material. If this should not be the case it would be difficult to polish the bearing surface smooth to the desired shape while also the detrition as a result of the movement of the record carrier on the bearing surface would be different for the various parts and plates as a result of which the bearing surface after some time will no longer meet the requirements imposed. These requirements are that the bearing surface must have a shape such that the friction between the record carrier and the bearing surface is small and that the screening plates extend to the surface so accurately that the influencing of the circuits which is so important in particular in the proximity of the bearing surface, is avoided.

The plate 15 which projects beyond the head on the front and rear sides comprises a groove 16 in which a plate 17 of a readily magnetizable material, for example, material known under the trademark "Mu-Metal," is provided which is secured therein, for example, by means of gluing. As is the case with the plate 15, the said plate 17 projects beyond the head on the front and rear sides and also projects downwards beyond the bottom portions 7 and 8.

Figure 3:
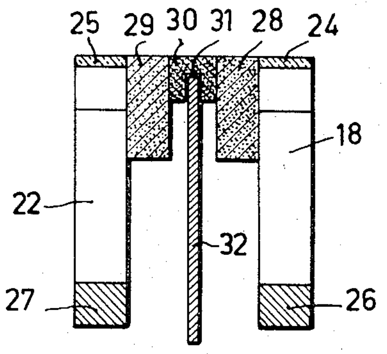
FIG. 3 is a cross-sectional view taken on the line III of FIG. 2 through a plane through the centre of the effective gaps.
Figure 2:
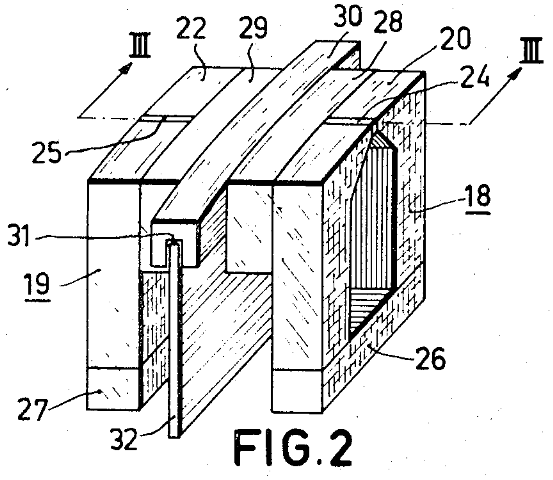
FIG. 2 is an isometric side elevation of a multiple magnetic head according to the invention with effective gaps in alignment.

In FIG. 2 and in the cross-section thereof in FIG. 3 the magnetic circuits 18 and 19 each consisting of at least two circuit elements 20, 21 and 22, 23 and each comprising an effective gap 24 and 25 respectively are arranged so that two parallel tracks of magnetic recordings can simultaneously be recorded, played back or erased on a record carrier. In the drawing the wire turns associated with each circuit are not shown. The parts 26 and 27 respectively of the magnetic circuits may be secured as separate elements as is shown in the drawing, but they may also be sawed as one unit with one of the "limbs" 20, 21 and 22 or 23 respectively.

The two circuits are separated by plates of non-magnetizable sintered oxidic material 28 and 29 between which the plate 30 of sintered oxidic readily magnetizable material is provided. The plate 30 comprises a groove 31 in which the plate 32 which consists of readily magnetizable material, can be secured. Both the plate 30 and the plate 32 project beyond the total head on the front and rear sides, while the plate 32 also projects on the lower side beyond the lower sides of the circuit elements.

Parts and plates as shown in the figures are secured together in known manner, for example, by means of enamel powder suspensions.

It is essential for the simple manufacture of magnetic heads as described above *first* to grind and polish the bearing surface of the head to the correct shape and *then* to provide the screening plates 17 and 32. When, as has been usual so far, the finishing of the bearing surface would be the final stage of the manufacture, there is a fair chance of damage of the thin screening plate projecting on that side beyond the head. In particular when the said screening plate consists of brittle sintered oxidic ferromagnetic material, fracture is hardly avoidable.

What is claimed is:

1. A multiple magnetic head comprising, at least two magnetic circuits each consisting of at least two interconnected magnetic circuit elements composed of sintered oxidic ferromagnetic material, each circuit containing at least one effective gap located at the bearing surface of the head, each pair of said circuits being physically connected together adjacent said bearing surface by means of two plates of nonmagnetic material and a third plate of sintered oxidic ferromagnetic material having the same resistance to detrition as said circuit elements located between said two plates, and an additional plate of magnetic material having higher permeability relative to said third plate and physically in contact at one end with said third plate and extending in line with said third plate on the side of the head remote from said bearing surface.

2. A multiple magnetic head as claimed in claim 1, wherein said additional plate is composed of a highly permeable metal alloy whose main constituent is Ni.

3. A multiple magnetic head as claimed in claim 1, wherein said additional plate is composed of a readily magnetizable sintered oxidic material.

4. A multiple magnetic head comprising: at least two magnetic circuits each consisting of at least two interconnected magnetic circuit elements composed of sintered oxidic ferromagnetic material, each circuit containing at least one effective gap located at the bearing surface of the head, each pair of said circuits being physically connected together adjacent said bearing surface by means of two plates of nonmagnetic material and a third plate of sintered oxidic ferromagnetic material, having the same resistance to detrition as said circuit elements located between said two plates, said third plate having a slot therein on the side remote from said bearing surface, and an additional plate of magnetic material having higher permeability relative to said third plate and having one end located in said slot and physically in contact with said third plate and extending in line with said third plate on the side of the head remote from said bearing surface.

References Cited

UNITED STATES PATENTS

| | | | |
|---|---|---|---|
| 2,922,231 | 1/1960 | Witt et al. | 340—174.1 |
| 3,064,333 | 11/1962 | Kristiansen et al. | 179—100.2 |

BERNARD KONICK, *Primary Examiner.*

J. P. MULLINS, *Assistant Examiner.*

U.S. Cl. X.R.

340—174.1